Patented Dec. 7, 1926.

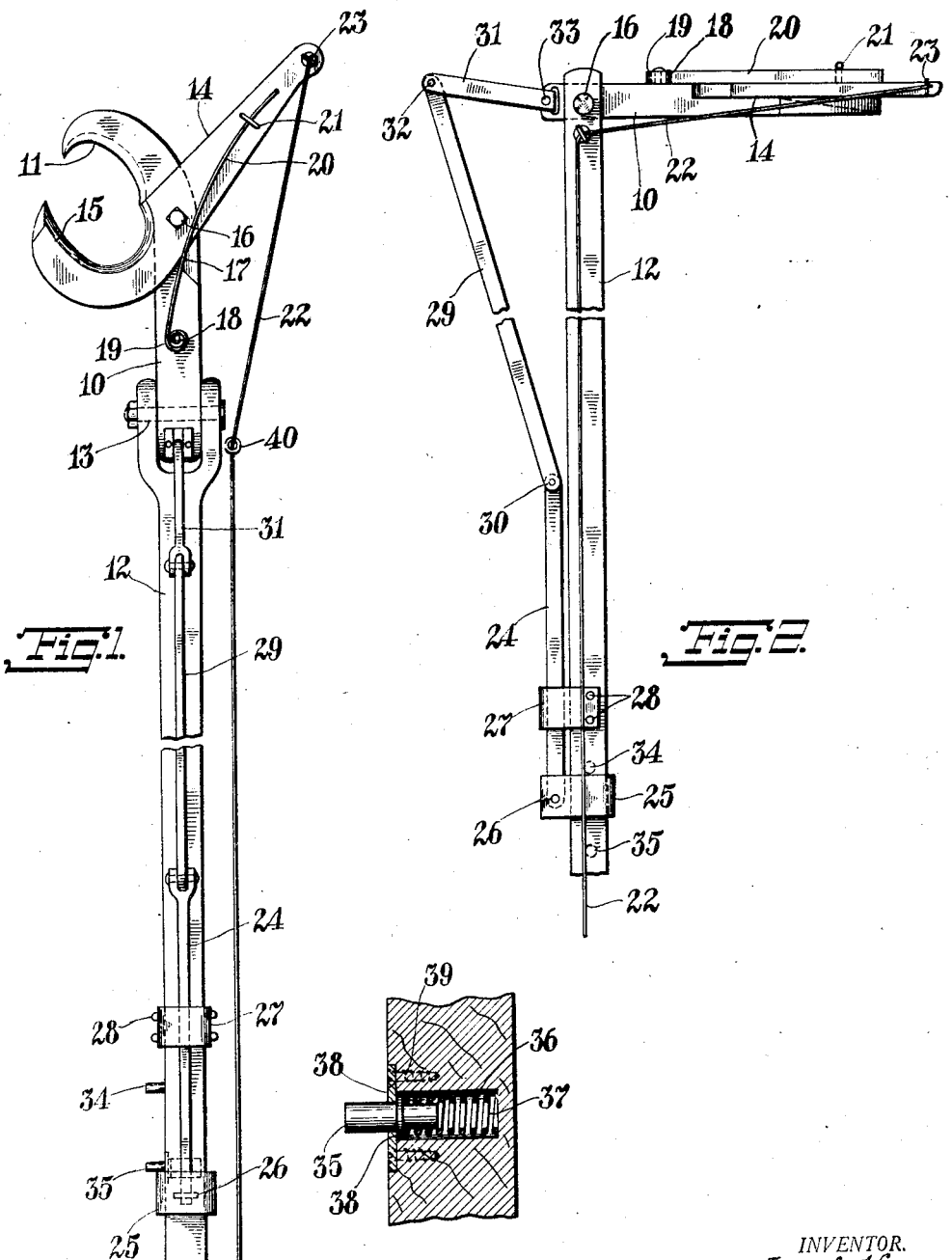

1,610,015

UNITED STATES PATENT OFFICE.

JOSEPH KOZMA, OF WYOMING, PENNSYLVANIA.

TREE-PRUNING SHEARS.

Application filed January 9, 1926. Serial No. 80,202.

This invention relates to a new and useful device in the nature of shears, said device being particularly adapted for pruning and cutting apples and the like from trees, which are not within reach of the harvester.

The object of the invention is to provide shears for pruning and cutting apples and the like from trees, of novel construction and arrangement of parts, hereinafter more fully described, claimed, and illustrated in the accompanying drawing, in which:—

Fig. 1 shows a front elevational view of my improved device with the shears vertically disposed.

Fig. 2 shows a side elevational view thereof, with the said shears horizontally disposed.

Fig. 3 shows an enlarged fragmentary detail view thereof.

As here embodied my improved device comprises a shear element 10, provided with a cutting edge 11 of suitable curved contour, and pivoted or hinged to a handle element 12, as at 13. The second shear element 14, is also provided with a similar cutting edge 15 of suitable curved contour, and is pivoted or hinged to the shear element 10, as at 16.

As a means of holding the shear element 10, and the second shear element 14 in a normally open position, I have provided a spring 17, having its extremity attached to the shear element 10, as at 18, by a protruding pin or screw, the spring 17 being coiled or wound around the said protruding pin, as designated by the numeral 19 on the accompanying drawing, and having an extended portion 20 slidably attached to the second shear element 14 by a protruding pin having its extremity 21 bent or formed at right angles thereto.

As a means of closing, or operating the shear element 10, and the second shear element 14, I have provided a depending flexible member 22, attached to the second shear element 14, as at 23.

As a means of swinging the shear element 10 and the second shear element 14, from a horizontal position to a vertical position, I have provided an operating rod 24 attached to a support 25, as at 26, the support 25 being slidably attached to the handle element 12, the operating rod 25 being slidably mounted in the guide 27 which is rigidly attached to the handle element 12, as at 28. The link 29 has its lower extremity pivoted to the operating rod 24, as at 30, and has its upper extremity pivoted to the arm 31, as at 32. The arm 31, is rigidly attached to the shear element 10, as at 33, at an angular relative position thereto, as clearly shown in the accompanying drawing.

The handle element 12 is provided with a protruding pin 34, so located as to hold the support 25, when the shear element 10 and the second shear element 14 are in a horizontal position, and a second protruding pin 35, to hold the support 25 when the shear element 10 and the second shear element 14 are in a vertical position, the said second protruding pin 35 being slidably located in an aperture 36, and normally protruded therefrom by a spring 37 by means of an enlarged portion 38 of the second protruding pin 35, a plate 38 attached to the handle element 12, as at 39, over the aperture 36 to hold the second protruding pin 35 in place therein.

The depending flexible member 22 is passed through the depending eye 40 attached to the handle element 12.

It is obvious that I have provided a device of the nature described which will permit the pruning of trees and the cutting or harvesting of apples and the like, which are not within reach of the harvester.

While I have above described the preferred form, construction and arrangement of the several elements employed, it will be understood that the device is nevertheless, susceptible of considerable modification therein, and I therefore reserve the privilege of resorting to all such changes as may be fairly embodied within the spirit and scope of the invention as claimed.

Having thus described my invention, what I claim as new, and desire to protect by Letters Patent of the United States is as follows:—

1. A device of the class described comprising a shear element and a second shear element, and a means for swinging the said shear element and the second shear element from a horizontal position to a vertical position, pivoted to and freely movable along a handle element and operatively connected thereto.

2. A device of the class described comprising a shear element and a second shear element, and a means for swinging the said shear element and the second shear element from a horizontal position to a vertical position, pivoted to a handle element and operatively connected thereto, and by means of an operating rod attached to a support slidably attached to the said handle element, the said operating rod slidably mounted in a guide rigidly attached to the said handle element.

3. A device of the class described comprising a shear element and a second shear element, and a means for swinging the said shear element and the second shear element from a horizontal position to a vertical position, pivoted to a handle element and operatively connected thereto, and by means of an operating rod attached to a support slidably attached to the said handle element, the said operating rod slidably mounted in a guide rigidly attached to the said handle element, and a link having its lower extremity pivoted to the said operating rod, and having its upper extremity pivoted to an arm rigidly attached to the said shear element at an angular relative position thereto.

4. A device of the class described comprising a shear element and a second shear element, and a means for swinging the said shear element and the second shear element from a horizontal position to a vertical position, pivoted to a handle element and operatively connected thereto, and by means of an operating rod attached to a support slidably attached to the said handle element, the said operating rod slidably mounted in a guide rigidly attached to the said handle element, and a link having its lower extremity pivoted to the said operating rod, and having its upper extremity pivoted to an arm rigidly attached to the said shear element at an angular relative position thereto, and a means of holding the said shear element and the second shear element in a normally open position by a spring having its extremity attached to the said shear element, the said spring being wound around a protruding pin in the said shear element, and having an extended portion slidably attached to the second shear element by a protruding pin having its extremity formed at right angles thereto.

5. A device of the class described comprising a shear element and a second shear element, and a means for swinging the said shear element and the second shear element from a horizontal position to a vertical position, pivoted to a handle element and operatively connected thereto, and by means of an operating rod attached to a support slidably attached to the said handle element, the said operating rod slidably mounted in a guide rigidly attached to the said handle element, and a link having its lower extremity pivoted to the said operating rod, and having its upper extremity pivoted to an arm rigidly attached to the said shear element at an angular relative position thereto, and a means of holding the said shear element and the second shear element in a normally open position by a spring having its extremity attached to the said shear element, the said spring being wound around a protruding pin in the said shear element, and having an extended portion slidably attached to the second shear element by a protruding pin having its extremity formed at right angles thereto, and a means of closing the said shear element and the said second shear element by a depending flexible member attached to the said second shear member and passed through an eye attached to the handle element.

6. A device of the class described comprising a shear element and a second shear element, and a means for swinging the said shear element and the second shear element from a horizontal position to a vertical position, pivoted to a handle element and operatively connected thereto, and by means of an operating rod attached to a support slidably attached to the said handle element, the said operating rod slidably mounted in a guide rigidly attached to the said handle element, and a link having its lower extremity pivoted to the said operating rod, and having its upper extremity pivoted to an arm rigidly attached to the said shear element at an angular relative position thereto, and a means of holding the said shear element and the second shear element in a normally open position by a spring having its extremity attached to the said shear element, the said spring being wound around a protruding pin in the said shear element, and having an extended portion slidably attached to the second shear element by a protruding pin having its extremity formed at right angles thereto, and a means of closing the said shear element and the said second shear element by a depending flexible member attached to the said second shear member and passed through an eye attached to the handle element, and a protruding pin located in the said handle element so as to hold the said support when the said shear element and the said second shear element are in the said horizontal position and a second protruding pin slidably located in an aperture in the said handle element and normally protruding therefrom by a spring by means of an enlarged portion of the second protruding pin, a plate attached to the said handle element over the said aperture to hold the said second protruding pin in place therein.

In testimony whereof I have affixed my signature.

JOSEPH KOZMA.